United States Patent

Furuse et al.

[11] Patent Number: 5,164,645
[45] Date of Patent: Nov. 17, 1992

[54] AUTOMATIC POSITIONING APPARATUS AND METHOD FOR CONTROLLING ATTITUDE OF VEHICLE MOUNTED DEVICE

[75] Inventors: Takahisa Furuse; Mitsuo Yokoyama, both of Yokohama, Japan

[73] Assignee: Jidosha Denki Kogyo K.K., Yokohama, Japan

[21] Appl. No.: 734,985

[22] Filed: Jul. 23, 1991

[30] Foreign Application Priority Data

Jul. 24, 1990 [JP] Japan .................................. 2-195250
Jul. 24, 1990 [JP] Japan .................................. 2-195251

[51] Int. Cl.$^5$ .......................... B60N 2/02; G05D 3/12
[52] U.S. Cl. .................................... 318/467; 318/266; 318/286
[58] Field of Search .................... 318/2, 488, 489, 675, 318/689, 264, 265, 266, 286, 466, 467, 468; 364/424.05; 180/6.2, 6.28

[56] References Cited

U.S. PATENT DOCUMENTS 4,503,504 3/1985 Suzumura et al. ............... 318/466 X
4,922,426 5/1990 Obara et al. ........................ 364/424.05

Primary Examiner—Bentsu Ro
Attorney, Agent, or Firm—Sughrue, Mion, Zinn, Macpeak & Seas

[57] ABSTRACT

An automatic positioning apparatus which comprises motors for actuating a vehicle mounted device, sensors for detecting position of the vehicle mounted device such as a seat, steering wheel or the like, and a control means which memorizes the position of the vehicle mounted device and drives it into the memorized position automatically and which sets a motor-suspensive zone, a renewal-prohibitive zone and a readjustment prohibitive zone in the vicinity of the memorized position, and stops the motors when the vehicle mounted device enters the motor-suspensive zone, prohibits to renewal the memorized position when the vehicle mounted device is within the renewal-prohibitive zone and prohibits an automatic action within the readjustment-prohibitive zone.

7 Claims, 10 Drawing Sheets

AUTOMATIC POSITIONING APPARATUS AND METHOD FOR CONTROLLING ATTITUDE OF VEHICLE MOUNTED DEVICE

BACKGROUND OF THE INVENTION

1. Field of the Invention

This invention relates to an automatic positioning apparatus for an automative vehicle to the used for automatically driving a vehicle mounted device into a memorized position suitable for the driver, and more particularly to a system and a method for controlling the attitude of the vehicle mounted device such as a seat, a steering wheel or the like, back and forth, up and down, for example.

2. Description of the Prior Art

Heretofore, there has been used an automatic positioning apparatus as shown in FIG. 11:

The automatic positioning apparatus 100 illustrated in the figure is so designed as to actuate a shaft 103 of a steering wheel 104 up and down between the upper position a and the lower position b through a tilt motor 102 and move the steering wheel 104 back and forth between the front side position c and the rear side position d by actuating the steering wheel shaft 103 telescopically through a telescopic movement motor 105 in accordance with a manual operation of a steering wheel positioning switch 101. The automatic positioning apparatus 100 is also designed so as to drive a seat 108 back and forth slidingly through a seat motor 109 in response to a manual operation of a seat positioning switch 110.

The tilt motor 102 and the telescopic movement motor 105 are connected with a controller 106 housed with a microcomputer through the steering wheel positioning switch 101, and the controller 106 is connected with a battery 107. The controller 106 is connected with the seat motor 109 through the seat positioning switch 110, and tilt data representing an inclination angle of the steering wheel shaft 103 detected by a tilt sensor 111, telescopic movement data representing a telescopic location of the steering wheel 104 detected by a telescopic movement sensor 112 and slide data representing a sliding location of the seat 108 detected by a seat sensor 113 are input to the controller 106 through an I/O interface circuit (not shown).

In case of memorizing driving positions suitable for a driver, the steering wheel shaft 103 is moved into the position e by actuating the tilt motor 102 and the steering wheel 104 is moved to the position f suitable for the driver by adjusting telescopic location of the steering wheel shaft 103 through the telescopic movement motor 105 according to the manual operation of the steering wheel positioning switch 101, and the seat 108 is moved slidingly into the position g suitable for the driver by actuating the seat motor 109 according to the manual operation of the seat positioning switch 110. In this state, the controller 105 memorizes the position e detected by the tilt sensor 111, the position f detected by the telescopic movement sensor 112 and the position g detected by the seat sensor 113 as the driving positions suitable for the driver in response to a presetting operation of a set switch (not shown) disposed on a switch board together with the seat positioning switch 110.

After this, the steering wheel 104 and the seat 108 move automatically to the respective positions e, f and g memorized by the controller as the driving positions suitable for the driver by actuating the tilt motor 102, the telescopic movement motor 105 and the seat motor 109 according to a positioning operation of the set switch.

Additionally, in the automatic positioning apparatus 100, electric currents are supplied to the tilt motor 102, the telescopic movement motor 105 and the seat motor 109 so as to actuate the steering wheel 104 and the seat 108 toward turnout positions by sensing an ignition key (not shown) to be pulled out from an ignition switch, sensing a door on the driver's seat side to be opened in case the ignition key is inserted into the ignition switch, or sensing the ignition key to be turned to the OFF-position from the ACC-position in the ignition switch in case the door is opened when the steering wheel positioning switch 101 is switched into the automatically operable state. Whereby, the shaft 103 of the steering wheel 104 is moved from the position e to the upper position a (turnout position) by the tilt motor 102, the sterring wheel 104 is moved from the position f to the front side position c (turnout position) by the telescopic movement motor 105, and the seat 108 is moved from the position g to position h (turnout position) shifted backwardly from the position g by predetermined distance after the positions where the steering wheel 104 and the seat 108 are at present (position e, position f and position g in this case) are memorized in the microcomputer of the controller 106. Therefore, the space between the steering wheel 104 and the seat is made wider, and it becomes easy to get in and out from the driver's seat of the automative vehicle.

At the state in which the steering wheel 104 and the seat 108 are in the turnout position, if the ignition key is inserted into the ignition switch, the door is closed when the ignition key is inserted into the ignition switch or the ignition key is turned to the (ON-position from the ACC-position in the ignition switch when the door is opened, electric currents are supplied to the tilt motor 102, the telescopic movement motor 105 and the seat motor 109 so as to actuate the steering wheel 104 and the seat 108 toward the previous positions memorized in the microcomputer of the controller 106 immediately before the steering wheel 104 and the seat 108 are actuated to the turnout positions. Whereby the steering wheel shaft 103 is moved from the turnout position a to the position e by the tilt motor 102, the steering wheel 104 is moved from the turnout position c to the position f by the telescopic motor 105 and the seat 108 is moved slidingly from the turnout position h to the position g by the saeat motor 109. In such a manner, the steering wheel 104 and the seat 108 return automatically to the positions memorized immediately before starting to the turnout positions, that is, the originally memorized positions e, f and g.

On the other side, in a case of actuating the steering wheel 104 or the seat 108 by manual operation while the vehicle is travelling for example, the automatic positioning apparatus 100 is so designed as to inch the motors so as not to obstruct the safety driving.

Namely, when the steering positioning switch 101 is switched on in the upward direction at time i as shown in FIG. 12 for example, an electric current is supplied to the tilt motor 102 in the forward rotational direction, thereby rotating the tilt motor 102 in the forward direction and actuating the steering wheel shaft 103 upwardly.

After the predetermined time, an electric current is supplied to the tilt motor 102 in the reverse rotational direction according to a downward signal output from the controller 106 at time j shown in the figure, whereby the tilt motor 102 stops by dynamic braking becasue the tilt motor 102 is supplied with the electric current in the forward rotational direction according to the manual operation of the steering wheel positioning switch 101 and the electric current in the reverse rotational direction according to the downward driving signal output from the controller 106 at the same time. Then the controller 106 discontinues to output the downward signal by sensing the steering wheel positioning switch 101 to be changed off, thereby shutting off the electric current in the reverse rotational direction to the tilt motor 102.

In such a manner, the motors are so designed as to be inched in the automatic positioning apparatus 100.

However, there is the possibility that the steering wheel 104 and the seat 108 pass over the memorized driving positions by inertia even if the power supply to the motors (tilt motor 102, telescopic motor 105, seat motor 109 and the like) is cut off at the time of the return to the memorized driving positions according to the positioning operation of the set switch.

Therefore, there is a problem since the steering wheel 104 and the seat 109 stop at the positions deviated from the proper driving positions memorized by the controller 106.

Additionally, if the presetting operation of the set switch is done in this time, there is another problem in that the positions deviating from the proper driving positions are newly memorized in the controller 106 as driving positions in spite that the driver does not have an intention to change the memorized driving positions. Where the driver repeats to get in and out from the driver's seat many times, there is also a problem in that the difference between the returning positions and the originally memorized driving positions gradually increases because the returning positions memorized in the controller 106 are renewed every time the driver gets out the vehicle and the steering wheel 104 and the seat 108 are actuated toward the turnout positions.

Furthermore, if the positioning operation of the set switch is done again after the steering wheel 104 and the seat 108 return toward the memorized driving positions according to the positioning operation of the set switch and stop once, the steering wheel 104 and the seat 108 are moved in the opposite direction because the steering wheel 104 and the seat 108 stop at the positions deviated from the memorized driving positions. Therefore, there is a problem since the driver is uncomfortable.

In addition to above, in case of manually actuating the steering wheel 104 or the seat 108 while the vehicle is travelling, the steering wheel 104 or the seat 108 is so designed as to be acutated by inching the tilt motor 102, the telescopic movement motor 105 or the seat motor 109 under the aforementioned control. However, as shown in FIG. 12, a time lag may be caused until the electric current in the reverse rotational direction is cut off after changing off the steering wheel positioning switch 101 at time k shown in the figure because the control needs some time to sensing the steering wheel positioning switch 101 to be changed off and to actuate a relay for cutting off the electric current to the tilt motor 102.

Accordingly, there is another problem in that the steering wheel 104 is actuated over again in the downward direction after moving in the upward direction and the driver feels displeasure because the electric current in the reverse rotational direction continue to be supplied to the tilt motor 102 for a short time even after the electric current in the forward rotational direction is cut off according to the manual operation of the steering wheel positioning switch 101.

SUMMARY OF THE INVENTION

The present invention is directed to solve the above-mentioned problems of the prior art, it is an object to provide an automatic positioning apparatus which is possible to minimize various inconvenience and malfunction due to the passing over of the vehicle mounted device such as the steering wheel, the seat or the like caused by inertia, and a method for controlling the attitude of the vehicle mounted device possible to minimize the influence of the inertia. It is another object to provide a method which is possible to prevent the vehicle mounted device from the reversal movement at the time of inching the vehicle mounted device by manual operation.

The construction of the automatic positioning apparatus for controlling the attitude of a vehicle mounted device according to this invention in order to accomplish the above-mentioned object is characterized by comprising motor means for actuating the vehicle mounted device, sensor means for detecting a position of the vehicle mounted device, and a control means which memorizes the position of the vehicle mounted device detected by the sensor means at the time of presetting a set switch in response to the presetting operation of the set switch and drives automatically the vehicle mounted device to the memorized position through the motor means in response to a positioning operation of the set switch. The control means which sets a motor-suspensive zone having a predetermined range in front and in rear of the memorized position and stops the motor means when the vehicle mounted device enters the motor-suspensive zone at the time of returning the vehicle mounted device to the memorized position automatically according to the positioning operation of the set switch. Accordingly, the vehicle mounted device such as a seat, a steering wheel or the like stops at the position immediate near the memorized position suitable for the driver because the motor means are suspended on an early occasion.

The control means also set a renewal-prohibitive zone having a predetermined range in front and in rear of the memorized position and prohibits to renew the memorized position when the vehicle mounted device are within the renewal-prohibitive zone. Whereby, as the renewal of the memorized position is prohibited in the renewal-prohibitive zone, the memorized position never shifts even if the presetting operation of the set switch or the turnout action of the vehicle mounted device is repeated, and the original position memorized suitably for the driver are maintained as it is.

Furthermore, the control means sets a readjustment-prohibitive zone having a predetermined range in front and in rear of the memorized position and prohibits the motor means to actuate the vehicle mounted device to the memorized position according to the positioning operation of the set switch once the vehicle mounted device stops within the readjustment-prohibitive zone. Therefore, the vehicle mounted device never moves in the opposite direction even if the positioning operation of the set switch is done again after the vehicle mounted device is actuated toward the memorized position and stops in the readjustment-prohibitive zone automatically.

Additionally, in the case of actuating the vehicle mounted device by manual operation while the vehicle is travelling for example, the motor means is stopped by supplying an electric current in the forward rotational direction and an electric current in the reverse rotational direction to the motor at the same time after the predetermined time since on-operation of a manual switch, and shutting off the electric currents in the both directions at the same time by detecting the manual switch to be changed off. Therefore, the vehicle mounted device never moves in the opposite direction after moving in one direction even if the time lag is caused by sensing the manual switch to be changed off or by actuating the relay to cut the current supply.

DESCRIPTION OF THE PREFERRED EMBODIMENT

An automatic positioning apparatus according to an embodiment of this invention and the control will be explained below on bases of FIG. 1 to FIG. 10.

Figure 1:
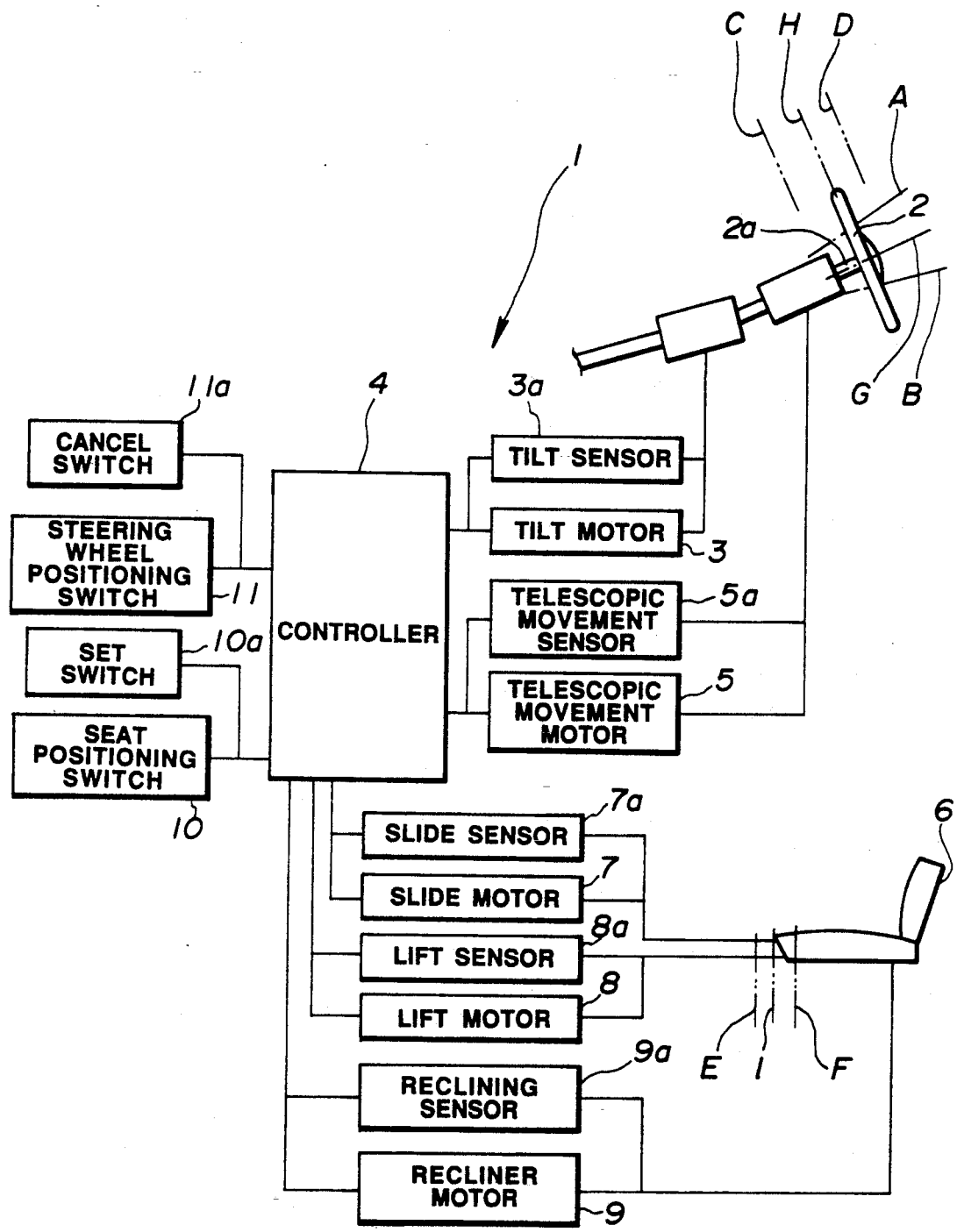
FIG. 1 is a block diagram showing the configuration of the automatic drive-positioning device according to this invention.

The automatic positioning apparatus 1 shown in FIG. 1 is provided with a controller 4, which is connected with a tilt motor 3 for actuating a shaft $2a$ of a steering wheel 2 up and down and adjusting an inclination angle of the steering wheel shaft $2a$ between upper position A and lower position B, a telescopic movement motor 5 for actuating the steering wheel shaft $2a$ back and forth telescopically and adjusting the steering wheel 2 between front side position C and rear side position D, a slide motor 7 for actuating a seat 6 back and forth slidingly between forward position E and backward position F, a lift motor 8 for actuating the seat 6 up and down and adjusting height of the seat 6 and a recliner motor 9 for adjusting an reclination angle of a seat back of the seat 6.

The controller 4 is housed with an I/O interface circuit and a microcomputer (not shown) connected with the I/O interface circuit. And the I/O interface circuit of the controller 4 is connected with a tilt sensor $3a$ for detecting the inclination angle of the steering wheel shaft $2a$, a telescopic movement sensor $3a$ for detecting a telescopic location of the steering wheel 2, a slide sensor $7a$ for detecting a sliding location of the seat 6, a lift sensor $8a$ for detecting the height of the seat 6 and an reclining sensor $9a$ for detecting the reclination angle of the seat back of the seat 6. The controller 4 is so designed that tilt data from the tilt sensor $3a$ representing the inclination angle of the steering wheel shaft $2a$, telescopic movement data from the telescopic movement sensor $5a$ representing the telescopic location of the steering wheel 2, slide data from the slide sensor $7a$ representing the sliding location of the seat 6, lift data from the lift sensor $8a$ representing the height of the seat 6 and reclination data from the reclining sensor $9a$ representing the reclination angle of the seat back of the seat 6 may be input to the microcomputer through the I/O interface circuit in the microcomputer 4.

The controller 4 is connected with a seat positioning switch 10 (manual switch), the seat 6 is actuated back and forth, or up and down through the slide motor 7 or the lift motor 8, and the seat back of the seat 6 is actuated back and forth recliningly through the recliner motor 9 by manually operating the seat positioning switch 10. The controller 4 is also connected with a set switch $10a$ to be operated in order to memorize present positions of the seat 6 and the steering wheel 2 in the microcomputer and to return them automatically into the memorized driving positions as described later, which is disposed on a switch board together with the seat positioning switch 10.

Additionally, the controller 4 is connected with a cancel switch $11a$ operable to cancel the automatic action of the seat 6 and the steering wheel 2, and a steering wheel positioning switch 11 (manual switch). The steering wheel 2 is actuated up and down, or back and forth telescopically through the tilt motor 3 or the telescopic movement motor 5 by manually operating the steering wheel positioning switch 11.

Figure 2:
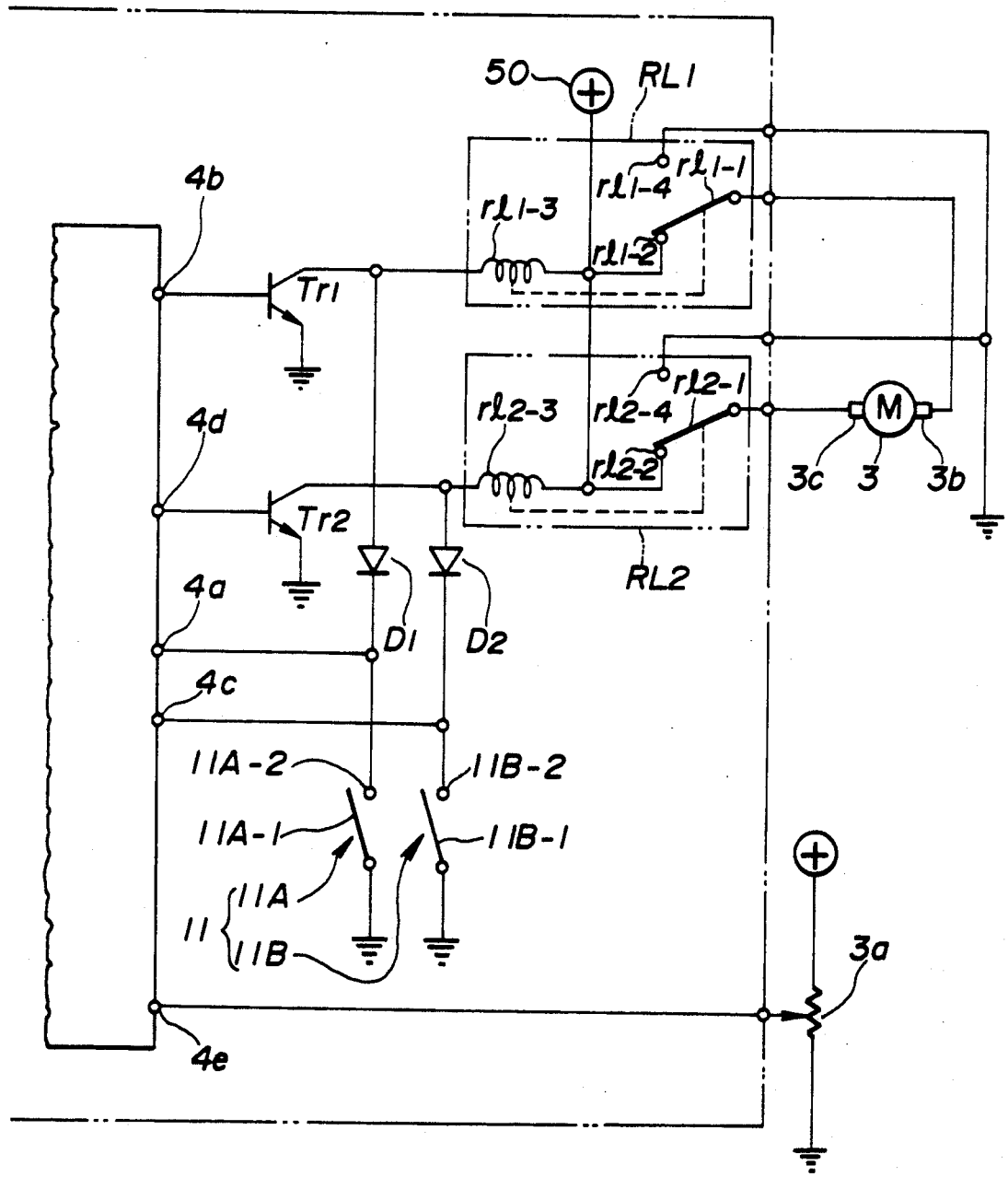
FIG. 2 is a circuit diagram for driving the tilt motor in the automatic drive-positioning device shown in FIG. 1.

FIG. 2 is a diagram showing a driving circuit of the tilt motor 3 among the motors as mentioned above, and the telescopic movement motor 5, the slide motor 7, the lift motor 8 and the recliner motor 9 also have similar driving circuits respectively.

As shown in FIG. 2, a power terminal $3b$ of the tilt motor 3 is connected to a travelling contact $rl_{1-1}$ of a forward rotational (upward driving) relay RL1, a normal close fixed contact $rl_{1-2}$ of the relay RL1 is connected to a power source 50 and a relay coil $rl_{1-3}$ of the relay RL1.

The relay coil $rl_{1-3}$ of the relay RL1 is connected to a fixed contact 11A-2 of a upward driving (forward rotational) switch 11A having a movable contact 11A-1 grounded of the steering wheel positioning switch 11 through a diode D1 and connected with collector of a transistor Tr1, a node between the diode D1 and the fixed contact 11A-2 is connected to a forward rotational (upward driving) signal input port $4a$ of the controller 4.

A normal open fixed contact $rl_{1-4}$ of the relay RL1 and emitter of the transistor Tr1 are grounded, and base of the transistor Tr1 is connected to a forward rotational (upward driving) signal output port $4b$ of the controller 4.

Another power terminal $3c$ of the tilt motor 3 is connected to a travelling contact $rl_{2-1}$ of a reverse rotational (downward driving) relay RL2, and a normal close fixed contact rl$_{2-2}$ of the relay RL2 is connected to the power source 50 and a relay coil rl$_{2-3}$ of the relay RL2.

The relay coil rl$_{2-3}$ of the relay RL2 is connected to a fixed contact 11B-2 of a downward driving (reverse rotational) switch 11B having a movable contact 11B-1 grounded of the steering wheel positioning switch 11 through a diode D2 and connected with collector of a transistor Tr2, a node between the diode D2 and the fixed contact 11B-2 is connected to a reverse rotational (downward driving) signal input port 4c of the controller 4.

A normal open fixed contact rl$_{2-4}$ of the relay RL2 and emitter of the transistor Tr2 are grounded, and base of the transistor Tr2 is connected to a reverse rotational (downward driving) signal output 4d of the controller 4.

Further, the controller 4 is provided with a data input port 4e to be input with tilt data detected by the tilt sensor 3a in addition to the respective ports 4a, 4b, 4c and 4d.

In case of setting driving positions suitable for the driver, in the first place the shaft 2a of the steering wheel 2 is shifted to position G suitable for the driver by manually operating the upward driving switch 11A or the downward driving switch 11B of the steering wheel positioning switch 11 into its ON-state. Namely, when the movable contact 11A-1 contacts with the fixed contact 11A-2 by changing the upward driving switch 11A of the steering wheel driving switch 11 on, the relay coil rl$_{1-3}$ of the relay RL1 is excited and the travelling contact rl$_{1-1}$ contacts with the normal open fixed contact rl$_{1-4}$. An electric current is supplied to the tilt motor 3 in the forward rotational direction (rightward direction in FIG. 2), thereby actuating the steering wheel shaft 2a upwardly. Contrary to above, if the downward driving switch 11B of the steering wheel positioning switch 11 is changed on, the relay coil rl$_{2-3}$ of the relay RL2 is excited and the travelling contact rl$_{2-1}$ contacts with the normal open fixed contact rl$_{2-4}$ thereby supplying an electric current to the tilt motor 3 in the reverse rotational direction (leftward direction in FIG. 2), and the steering wheel shaft 2a is actuating downwardly.

Similarly to above, the steering wheel 2 is shifted to position H suitable for the driver by actuating the telescopic movement motor 5 through its driving circuit in response to an ON-operation of a forward driving switch or a backward driving switch (not shown) of the steering wheel positioning switch 11. Subsequently, by manually operating the seat positioning switch 10, the seat 6 is shifted sliding to position I suitable for the driver through the slide motor 7, and the seat 6 and the seat back of the seat 6 are also adjusted to the appropriate height and the reclination angle for the driver through the lift motor 8 and the recliner motor 9 respectively in the same manner.

In this state, by presetting the set switch 10a, the position G detected by the tilt sensor 3a, the position H detected by the telescopic movement sensor 5a, the position I of the seat 6 detected by the slide sensor 7a, the height of the seat 6 and the reclination angle of the seat back of the seat 6 detected the lift sensor 8a and the reclining sensor 9a are memorized respectively in the microcomputer of the controller 4 as driving positions suitable for the driver.

From this time forth, the steering wheel 2 and the seat 6 return automatically to the respective positions G, H, I and so on memorized in the microcomputer of the controller 4 as the driving positions suitable for the driver by actuating the tilt motor 3, the telescopic movement motor 5, the slide motor 7, the lift motor 8 and the recliner motor 9 in response to the positioning operation of the set switch 8a no matter where they are.

In this time, the controller 4 drives, for example, the tilt motor 3 shown in FIG. 2 in the forward or the reverse direction by outputting a forward rotational signal from the output port 4b to the transistor Tr1 or by outputting a reverse rotational signal from the output port 4d to the transistor Tr2. Namely, if the transistor Tr1 comes to its ON-state by the forward rotational signal from the output port 4b of the controller 4, the relay coil rl$_{1-3}$ is excited, the tilt motor 3 rotates in the forward direction and the steering wheel shaft 2a is driven upwardly. If the transistor Tr2 comes to its ON-state by the reverse rotational signal from the output port 4d of the controller 4, the relay coil rl$_{2-3}$ is excited, the tilt motor 3 rotates in the reverse direction and the steering wheel shaft 2a is driven downwardly.

Additionally, at the state in which the cancel switch 11a is changed off (automatically operable state) the controller 4 actuates the tilt motor 3, the telescopic movement motor 5 and the slide motor 7 in order to drive the steering wheel 2 and the seat 6 into turnout positions (turnout action) after the positions where they are just before the turnout action (position H, position H and position I) are memorized in the microcomputer as returning positions by sensing an ignition key to be pulled out from an ignition switch, sensing a door on the driver's seat side to be opened in case the ignition key is inserted into the ignition switch or sensing the ignition key to be turned to the OFF-position from the ACC-position of the ignition switch. Whereby, the steering wheel shaft 2a is driven to the upper position A (turnout position) from the memorized position G, the steering wheel 2 is driven to the front side position C (turnout position) from the memorized position H, and the seat 6 is also driven to the turnout position shifted backwardly from the memorized position I by predetermined distance so as not to obstruct the driver from getting on and off the vehicle.

In this state, when the controller 4 senses that the ignition key is inserted into the ignition switch, the door is closed in the case the ignition key is inserted into the ignition switch, or the ignition key is turned to the ON-position from the ACC-position in the case the door is opened, the controller 4 actuates the tilt motor 3, the telescopic movement motor 5 and the slide motor 7 so as to return the steering wheel 2 and the seat 6 into the returning positions memorized in the microcomputer. Whereby the steering wheel shaft 2a returns to the position G, the steering wheel 2 returns to the position H, and the seat 6 return to the position I suitable for the driver from the respective turnout positions.

Next, explanation will be given about control in the automatic drive-positioning device 1 according to this invention on basis of FIG. 3 to FIG. 10.

Figure 3:
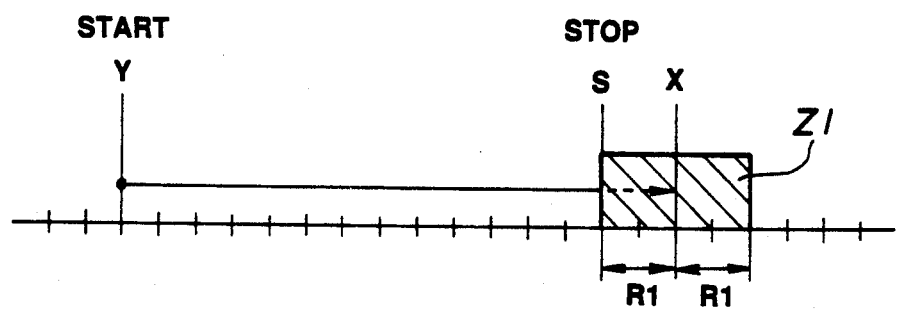
FIG. 3 is a conceptional diagram of the control using a motor-suspensive zone.

First, of all, a motor-suspensive zone A1 having a predetermined range R1 is set in front and in rear of a memorized position X of the steering wheel 2 or the seat 6 as shown in FIG. 3.

Figure 4:
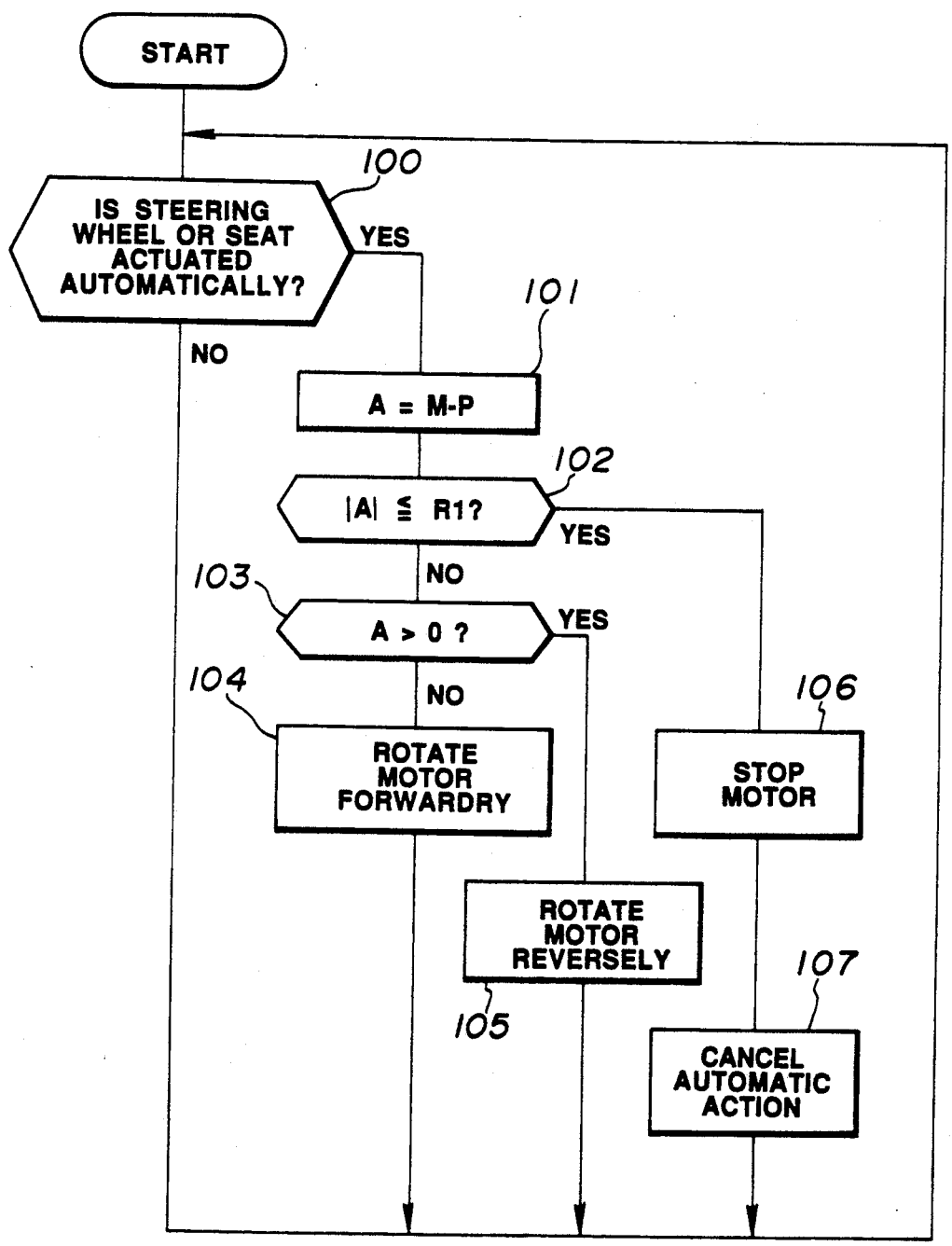
FIG. 4 is a flowchart explaining the control using the motor-suspensive zone shown in FIG. 3.

Starting a program shown in FIG. 4, judgement is done at step 100 as to whether or not the steering wheel 2 or the seat 6 is actuated automatically to the memorized position X. The judgement at step 100 is repeated until the steering wheel 2 or the seat 6 starts to the memorized position X according to, for example, the positioning operation of the set switch 10a. When the steering wheel 2 or the seat 6 starts according to the positioning operation of the set switch 10a, difference A between address number M representing the memorized position X and address number P detected by the appropriate sensor and representing the position of the steering wheel 2 or the seat 6 at present is calculated at step 101. And control proceeds to succeeding step 102.

In step 102, judgement is done as to whether the absolute value of the difference A is smaller than the predetermined range R1 or not, namely whether the steering wheel 2 or the seat 6 is within the motor-suspensive zone Z1 or not. If the steering wheel 2 or the seat 6 does not yet arrive within the motor-suspensive zone Z1 (NO), judgement is done as to whether the difference A is positive or not at step 103.

When the difference A is not positive at step 203 (NO), control returns to step 100 after rotating the motor in the forward direction in order to actuate the steering wheel 2 or the seat 6 toward the memorized position Z at succeeding step 104. And if the difference A is positive at step 103 (YES), control returns to step 100 after rotating the motor in the opposite direction at step 105.

When the absolute value of the difference A is smaller than the predetermined range R1 at step 102 (YES), the steering wheel 2 or the seat 6 is judged to arrive within the motor-suspensive zone Z1 the motor is stopped at step 106, and control returns to step 100 after cancelling the automatic action in the automatic positioning apparatus 1.

Namely, as shown in FIG. 3, the steering wheel 2 or the seat 6 starts from the position Y for the memorized position X, and the electric current to the motor is shut off at the position S when the steering wheel 2 or the seat 6 arrives in the motor-suspensive zone Z1. Therefore the steering wheel 2 or the seat 6 stops in the immediate neighborhood of the memorized position X suitable for the driver by the inertia.

Figure 5:
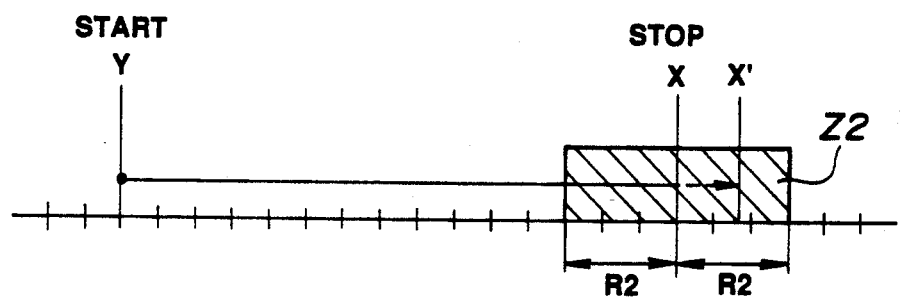
FIG. 5 is a conceptional diagram of the control using a renewal-prohibitive zone.

A renewal-prohibitive zone Z2 having a predetermined range R2 is also set in front and in rear of a memorized position X of the steering wheel 2 or the seat 6 as shown in FIG. 5.

Figure 6:
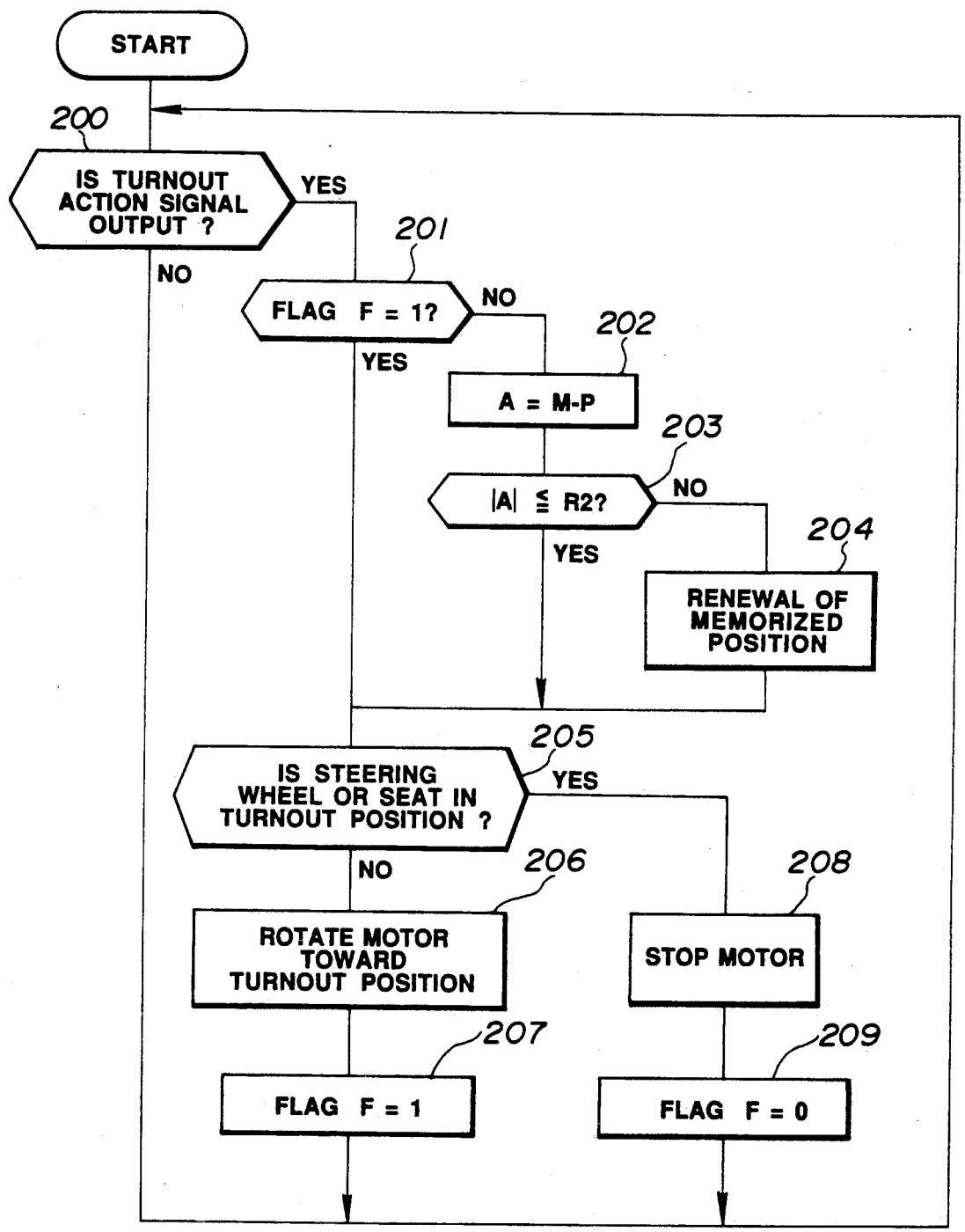
FIG. 6 is a flowchart explaining the control using the renewal-prohibitive zone shown in FIG. 5.

As shown in the flowchart of FIG. 6, judgement is done as to whether a turnout action signal is output or not, that is, whether or not the ignition key is pulled out from the ignition switch, the door is opened or the ignition key is turned to the OFF-position from the ACC-position at step 200. The judgement in step 200 is repeated until the turnout action signal is output.

When the turnout action signal is output, control proceeds to step 201 and judgement is done as to whether a control flag F is "1" or not. The control flag F is judged not to be "1" at step 201 in the first stage of the control because the control flag F is cleared, and difference A between address number M representing the memorized position X and address number P detected by the sensor and representing the position where the steering wheel 2 or the seat 6 is at present is calculated at step 202. And control proceeds to succeeding step 203.

In step 203, judgement is done as to whether the absolute value of the difference A is smaller than the predetermined range R2 or not, that is whether the steering wheel 2 or the seat 6 is within the renewal-prohibitive zone Z2 or not. If the absolute value of the difference A is not smaller than R2 (NO), namely the steering wheel 2 or the seat 6 is judged to be out of the renewal-prohibitive zone Z2, the memorized position X is renewed and the position where the steering wheel 2 or the seat 6 at present is newly memorized in the microcomputer in the controller 4 at step 204, control proceeds to step 205. If the steering wheel 2 or the seat 6 is judged to be within the renewal-prohibitive zone Z2 at step 203, control proceeds to step 205 directly.

In the step 205, judgement is done as to whether the steering wheel 2 or the seat 6 arrives in the turnout position or not. The judgement is "NO" at step 205 because the steering wheel 2 or the seat 6 does not yet arrive in the turnout position in the earlier stage of the control, and the motor is rotated in order to actuate the steering wheel 2 or the seat 6 into the turnout position at succeeding step 206. Control returns to step 200 after setting the control flag F into "1" at step 207.

In step 201 after judging to be "YES" at step 200, the control flag F is judged to be "1" (YES) in this time as the flag F is set into "1" at step 207 and control proceeds to step 205 directly.

In step 205, judgement is done as to whether the steering wheel 2 or the seat 6 arrives in the turnout position or not, the judgement in step 205 is repeated until the steering wheel 2 or the seat 6 arrives in the turnout position. And the steering wheel 2 or the seat 6 arrives in the turnout position, the motor is stopped at step 208 and control return to step 200 after clearing the control flag F at step 209.

Namely, in the case where the steering wheel 2 or the seat 6 starts from the position Y for the memorized position X and stops at position X' deviated from the position X by the inertia at the time of stopping the motor at the position X as show in FIG. 5, the memorized position X is never renewed into the position X' deviated from the position X even if the positioning operation of the set switch 10a or the turnout action is done. Accordingly, the originally memorized position X suitable for the driver is maintained as it is.

In addition to above, also in the case where the positioning operation of the set switch 10a is done at step 200, the control is executed similarly to above.

Figure 7:
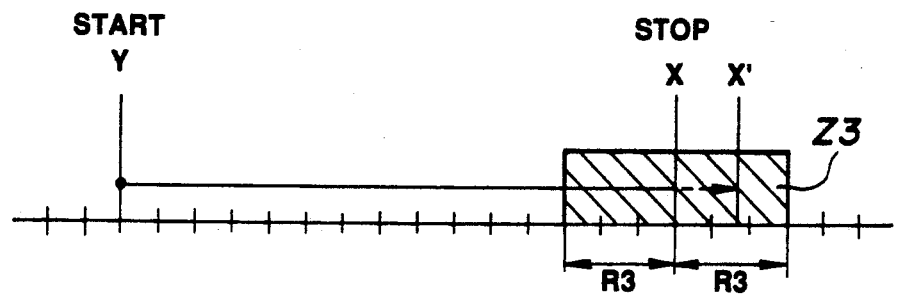
FIG. 7 is a conceptional diagram of the control using a readjustment-prohibitive zone.
Figure 8:
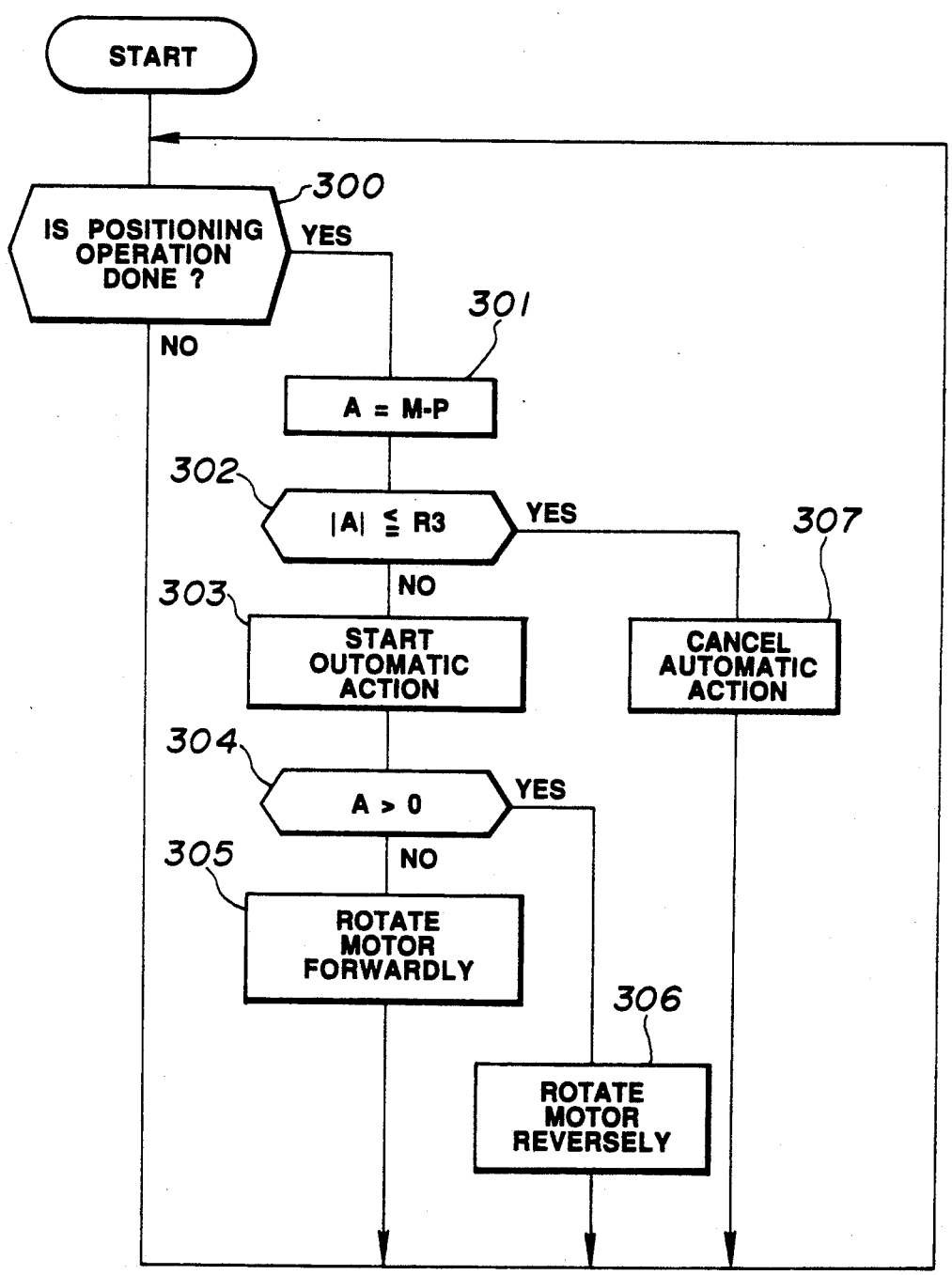
FIG. 8 is a flowchart explaining the control using the readjustment-prohibitive zone shown in FIG. 7.

Furthermore, a readjustment-prohibitive zone Z3 having a predetermined range R3 is set in front and in rear of a memorized position X of the steering wheel 2 or the seat 6 as shown in FIG. 7 and control is executing according to the flowchart shown in FIG. 8.

In step 300, judgement is done as to whether the positioning operation of the set switch 10a is done or not, that is, the automatic action is started or not. The judgement at step 300 is repeated until the automatic action is started.

When the positioning operation of the set switch 10a is done at step 300 (YES), control proceeds to step 301 difference A is calculated similarly to the step 101 in FIG. 4 and the step 202 in FIG. 6 and control proceeds to step 302.

In step 302, judgement is done as to whether the absolute value of the difference A is smaller than the predetermined range R3 or not, that is, whether the steering wheel 2 or the seat 6 is within the readjustment-prohibitive zone Z3 or not. If the absolute value of the difference A is not smaller than R3, the steering wheel 2 or the seat 6 is judged to be out of the readjustment-prohibitive zone Z3 and the automatic action of the steering wheel 2 or the seat 6 is started at step 303. Judgement is done at step 303, the motor is rotated in the forward direction or the opposite direction according to the position of the steering wheel 2 or the seat 6 at step 305 and step 306, respectively, and control returns to step 300.

When the steering wheel 2 or the seat 6 is judged to be within the readjustment-prohibitive zone Z3 at step 302, the automatic action of the steering wheel 2 or the seat 6 is cancelled at step 307, and control returns to step 300.

Namely, in the case where the steering wheel 2 or the seat 2 starts from the position Y toward the memorized position X and stops at position X' deviated from the position X by the function of the inertia at the time of stopping the motor at the position X as shown in FIG. 7, the steering wheel 2 or the seat 6 is not actuated to the memorized position X in the opposite direction even if the positioning operation of the set switch 10a is done again.

Figure 9:
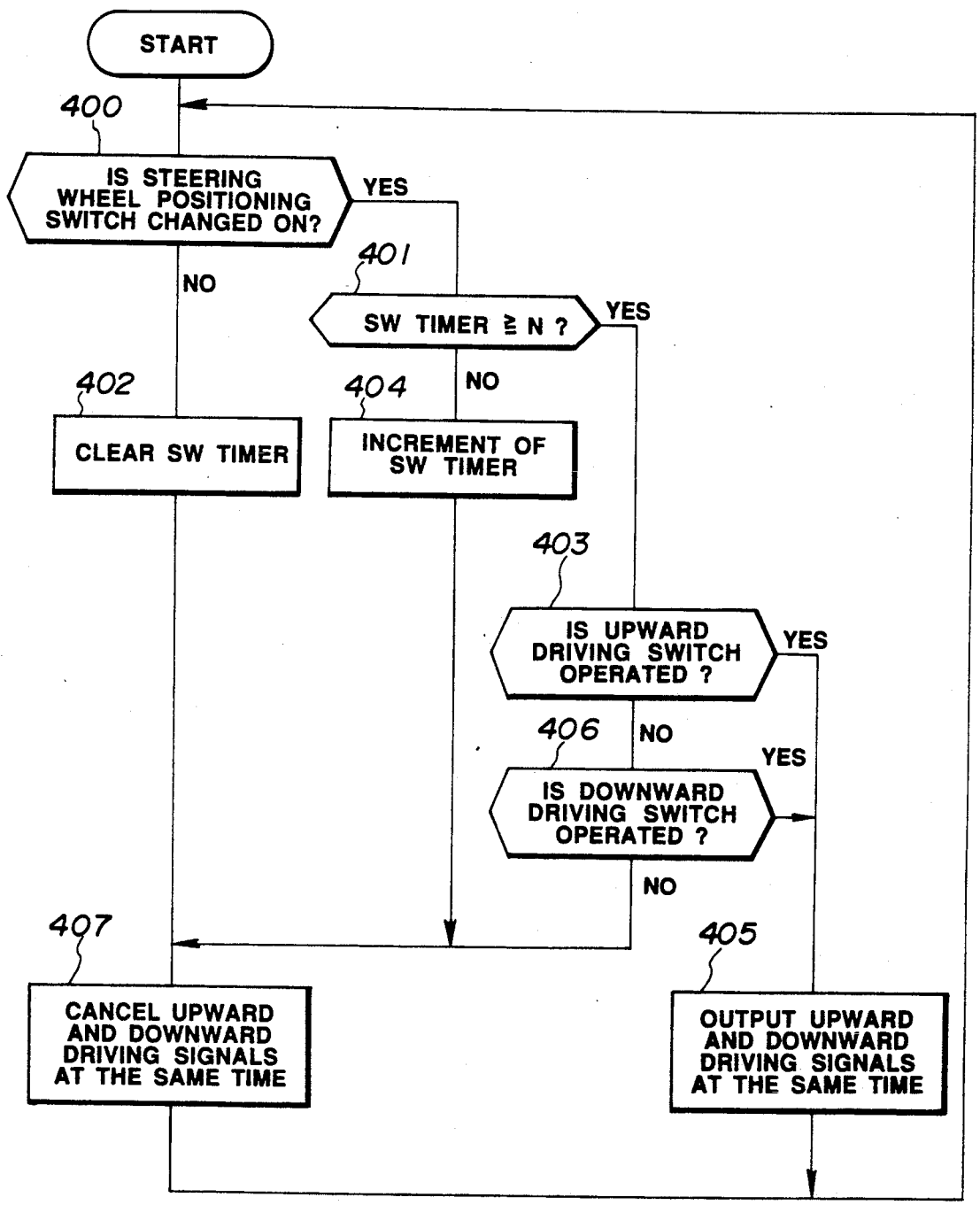
FIG. 9 is a flowchart explaining the control at the time of manually actuating the steering wheel in the automatic positioning apparatus shown in FIG. 1.

Additionally, control is done as shown in FIG. 9 in case of actuating the steering wheel 2 or the seat 6 by inching the motor while, for example, the vehicle is travelling. Explanation will be given below on basis of FIG. 2, FIG. 9 and FIG. 10 taking the case of the tilt motor 3 as an example.

In step 400 in the flowchart shown in FIG. 9, judgement is done as to whether the steering wheel positioning switch 11 (manual switch) is changed on or not. When the steering wheel positioning switch 11 is changed on (YES), judgement is done as to whether the predetermined time N set in a switch timer elapses or not at step 401. Control proceeds to step 404 and increment of the switch timer is done because the predetermined time does not yet elapse in the early stage of the control.

The judgement is repeated at step 401 until the predetermined time elapses, when the predetermined time elapses, judgement is "YES" at step 401 and control proceeds to step 403.

Judgement is done as to whether the upward driving (forward rotational) switch 11A of the steering wheel positioning switch 11 is operated or not at step 403, and judgement is done as to whether the downward driving (reverse rotational) switch 11B of the steering wheel positioning switch 11 is operated or not at step 406. When the judgement is done at steps 403 and 406 that the upward driving switch 11A or the downward driving switch 11B is operated, control proceeds to step 405 and the controller 4 outputs the upward driving (forward rotational) signal and the downward driving (reverse rotational) signal to the transistors Tr1 and Tr2 from the output ports 4b and 4d at step 405, thereby actuating the relays RL1 and RL2, the electric current in the forward rotational direction and the electric current in the reverse rotational direction are supplied to the tilt motor 3 at the same time, therefore the tilt motor 3 stops by dynamic braking. Control returns to step 400.

If the judgement is done at steps 403 and 406 that both the upward driving switch 11A and the downward driving switch 11B are not operated, the controller 4 judges the steering wheel positioning switch 11 to be operated in another direction and cancels the upward driving signal and the downward signal at the same time at step 407. Control returns to step 400.

In step 400, if the judgement is done that the steering wheel positioning switch 11 is changed off (NO), the upward driving signal and the down ward signal are cancelled at the same time in step 407 after clearing the SW timer at step 402, and control returns to step 400.

Figure 10:
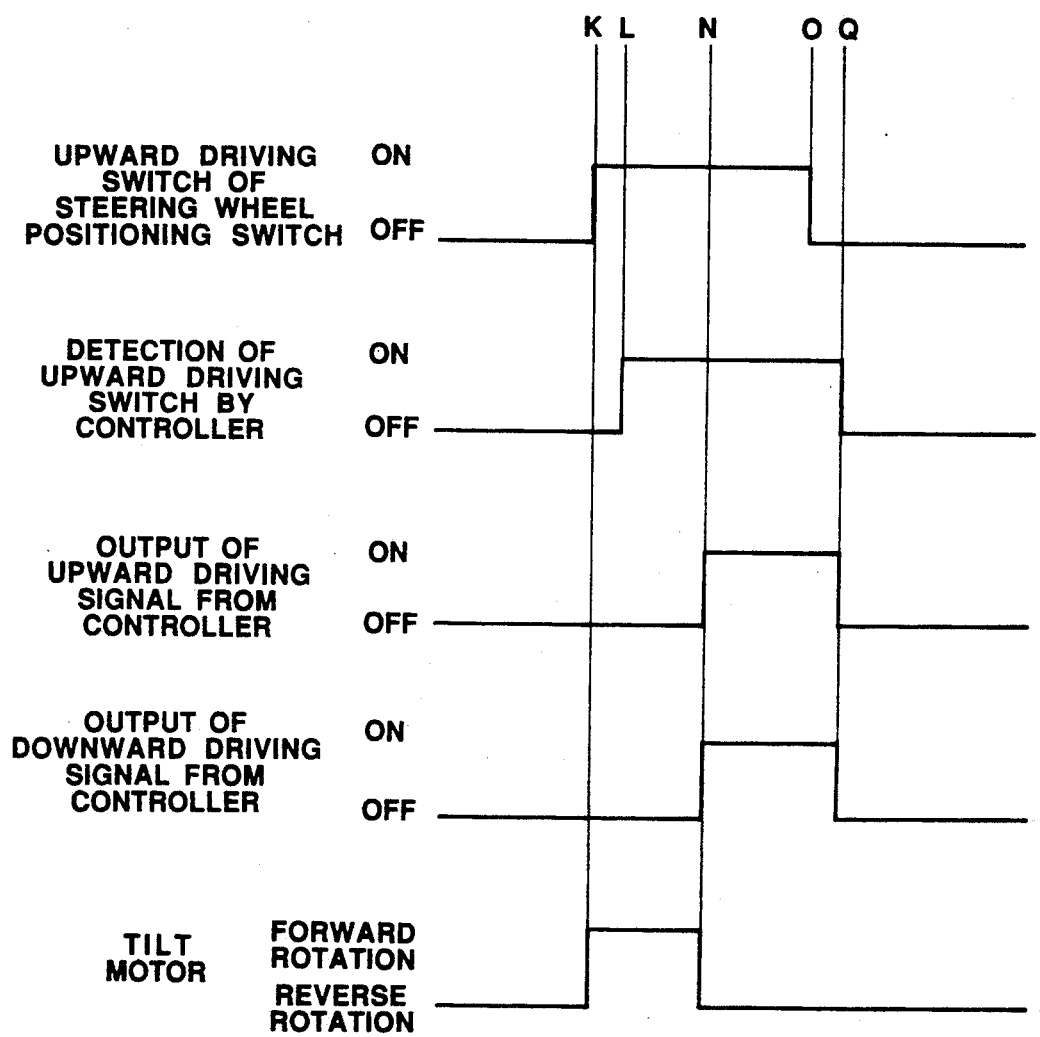
FIG. 10 is a time chart illustrating the timing of the control shown in FIG. 9.
Figure 11:
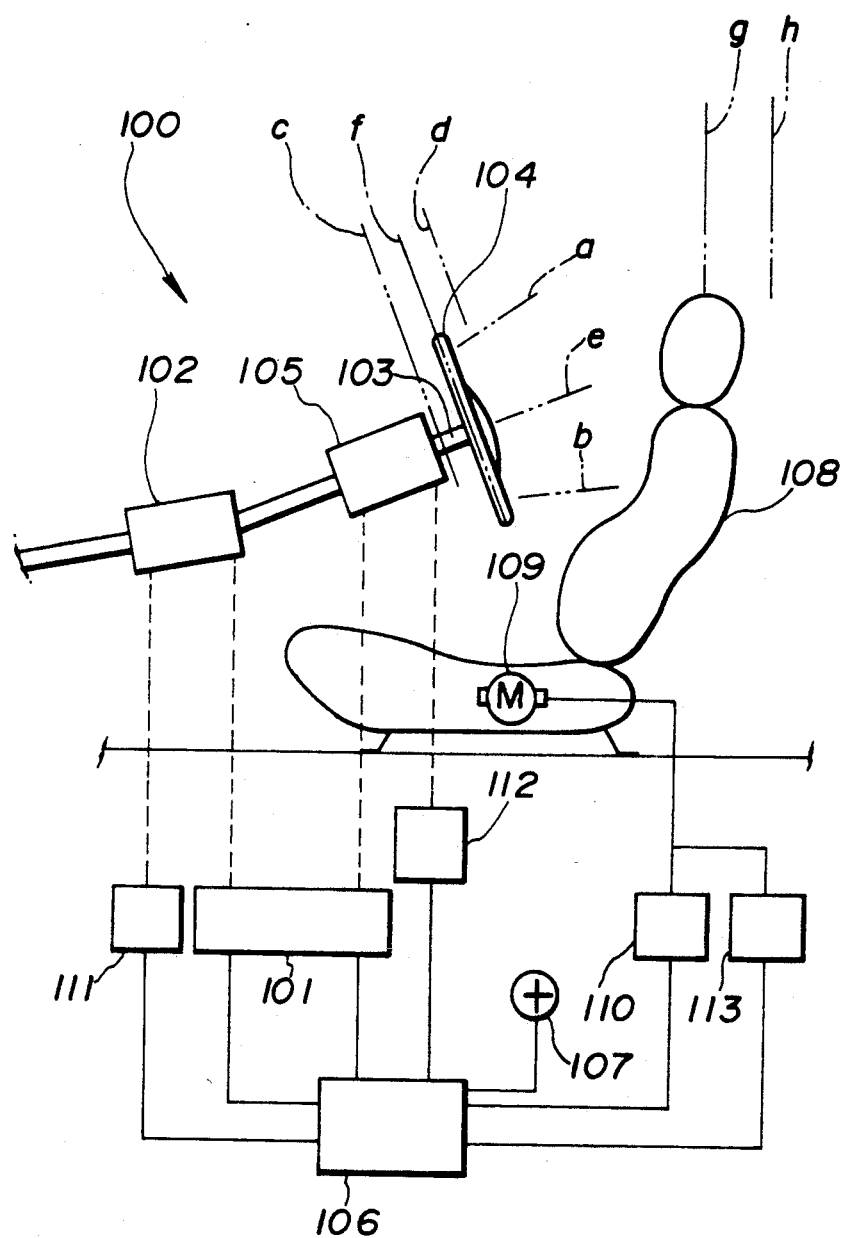
FIG. 11 is a block diagram of the conventional automatic positioning apparatus.
Figure 12:
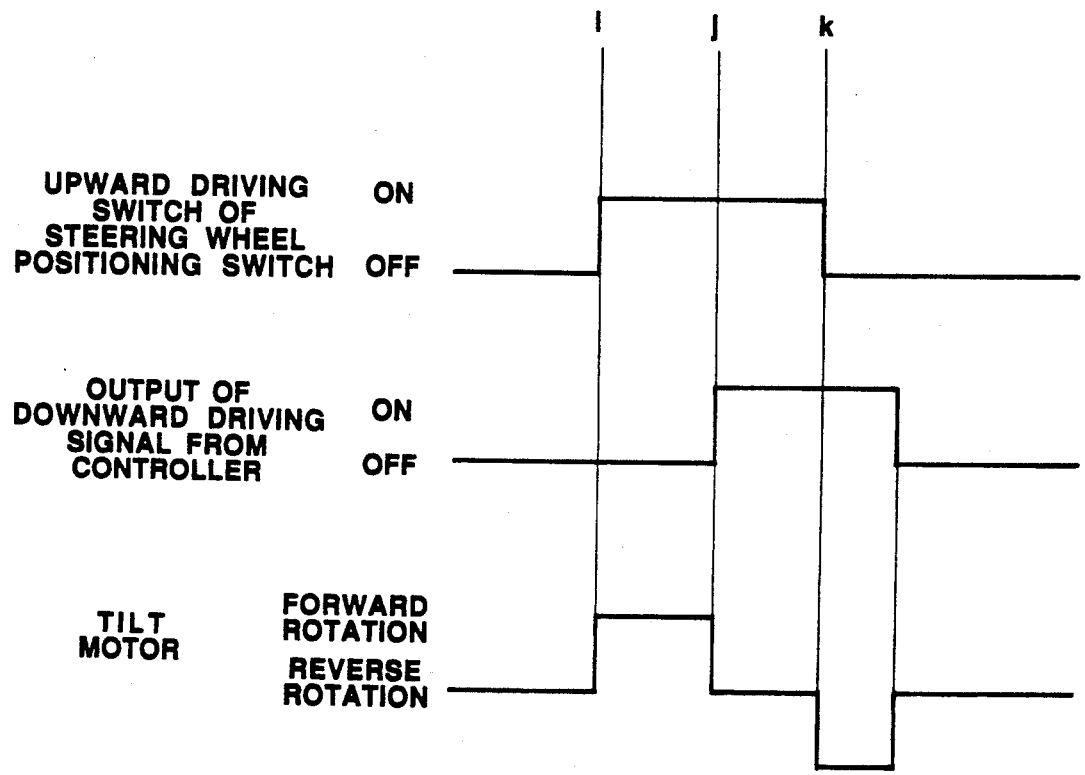
FIG. 12 is a time chart explaining the control at the time of manually actuating the steering wheel in the conventional positioning apparatus shown in FIG. 11.

Namely, as shown in FIG. 10, when the upward driving switch 11a of the steering wheel positioning switch 11 is changed on at point K, an electric current in the forward rotational direction is supplied to the tilt motor 3 and the tilt motor 3 rotates so as to actuate the steering wheel shaft 2a in the upward direction. In this time, the controller 4 detects the upward driving switch 11a to be changed on at point L after some time lag.

The controller 4 outputs the upward driving signal and the downward driving signal from the output ports 4b and 4d to the transistors Tr1 and Tr2 at point N after the predetermined time whereby, the tilt motor 3 is stopped rotational direction and an electric current in the reverse rotational direction at the same time, and stops by dynamic braking.

When the upward driving switch 11a of the steering wheel positioning switch 11 is changed off at point O, the controller 4 detects the off-operation and discontinues to output the upward driving signal and the downward driving signal at the same time at point Q after some time lag.

Therefore, the tilt motor 3 is inched for only predetermined time by manually operating the steering wheel positioning switch 11 without the reverse rotation.

Although the explanation is only given about the tilt motor 3, the other motors such as the telescopic movement motor 5, the slide motor 7, the lift motor 8 and so on can be controlled in the same manner.

As mentioned above, in the automatic positioning apparatus and the method for controlling the attitude of the vehicle mounted device according to this invention, it is possible to minimize various inconvenience and malfunction due to the passing over of the vehicle mounted device caused by the inertia, and possible to prevent the vehicle mounted device from the reversal movement at the time of inching the vehicle mounted device by manual operation.

What is claimed is:

1. An automatic positioning apparatus for controlling the attitude of a vehicle mounted device, the apparatus comprising;

motor means for actuating the vehicle mounted device;

sensor means for detecting a position of said vehicle mounted device; and a control means which memorizes the position of said vehicle mounted device detected by said sensor means at the time of presetting a set switch and controls said motor means to drive automatically said vehicle mounted device to the memorized position in response to the positioning operation of said set switch, and said control means also sets a motor-suspensive zone having a predetermined range in front and in rear of the memorized position and stops said motor means when the vehicle mounted device enters said motor-suspensive zone at the time of positioning said vehicle mounted device to said memorized position automatically according to the positioning operation of said set switch.

2. An automatic positioning apparatus for controlling the attitude of a vehicle mounted device as set forth in claim 1, wherein said control means further sets a renewal-prohibitive zone having a predetermined range in front and in rear of the memorized position and prohibits to renew the memorized position when said vehicle mounted device is within said renewal-prohibitive zone.

3. An automatic positioning apparatus for controlling the attitude of a vehicle mounted device as set forth in claim 2, wherein said control means further sets a readjustment-prohibitive zone having a predetermined range in front and in rear of the memorized position and prohibits said motor means to actuate the vehicle mounted device to the memorized position according to the positioning operation of said set switch once said vehicle mounted device stops within said readjustment-prohibitive zone.

4. An automatic positioning apparatus for controlling the attitude of a vehicle mounted device as set forth in claim 3, wherein said motor means has a tilt motor for adjusting an inclination angle of a shaft of a steering wheel, a telescopic movement motor for actuating the steering wheel shaft back and forth telescopically, as slide motor for actuating a seat back and forth slidingly, a lift motor for adjusting height of the seat and a recliner motor for adjusting an reclination angle of a seat back of the seat; and said sensor means has a tilt sensor for detecting the inclination angle of the steering wheel shaft, a telescopic movement sensor for detecting the telescopic location of the steering wheel, a slide sensor for detecting the location of the seat, a lift sensor for detecting the height of the seat and a reclining sensor for detecting the reclination angle of the seat back of the seat.

5. In a method for controlling the attitude of a vehicle mounted device comprising the steps of;

memorizing a position of the vehicle mounted device at the time of presetting a set switch, via a memory means in response to the presetting operation of the set switch; and driving said vehicle mounted device to the memorized position through motor means in response to a positioning operating of said set switch;

setting a motor-suspensive zone having a predetermined range in front and in rear of the memorized position; and stopping the motor means when said vehicle mounted device enters said motor-suspensive zone at the time of positioning the vehicle mounted device to said memorized position automatically according to the positioning operation of said set switch.

6. In a method for controlling the attitude of a vehicle mounted device, comprising;

memorizing a position of the vehicle mounted device at the time of presetting a set switch, via a memory means in response to the presetting operation of the set switch; and driving said vehicle mounted device to the memorized position through motor means in response to a positioning operation of said set switch;

setting a renewal-prohibitive zone having a predetermined range in front and in rear of the memorized position; and prohibiting to renew the memorized position when said vehicle mounted device is within said renewal-prohibitive zone.

7. In a method for controlling the attitude of a vehicle mounted device comprising;

memorizing a position of the vehicle mounted device at the time of presetting a set switch, via a memory means in response to the presetting operation of the set switch; and driving said vehicle mounted device to the memorized position through motor means in response to a positioning operation of said set switch;

setting a readjustment-prohibitive zone having a predetermined range in front and in rear of the memorized position; and prohibiting the motor means to actuate said vehicle mounted device from the memorized position according to the positioning operating of said set switch once the vehicle mounted device stops within said readjustment-prohibitive zone.

* * * * *